Nov. 6, 1951 W. McMULLAN 2,574,274
SHUTTERING FOR THE CONSTRUCTION OF WALLS
Filed Aug. 6, 1947 15 Sheets-Sheet 1
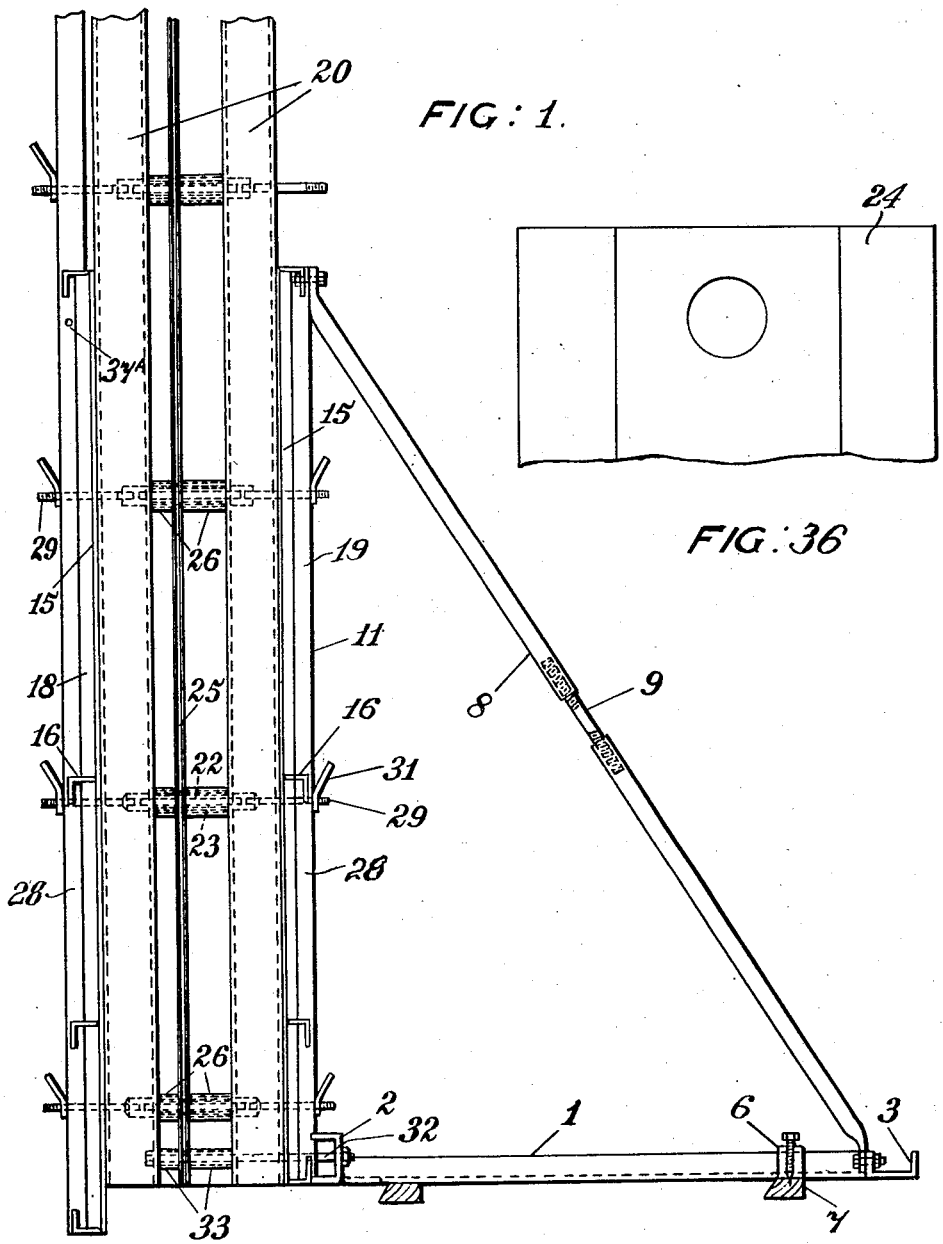
Inventor:
William McMullan
By: John A. Marzall, Atty.

Nov. 6, 1951 W. McMULLAN 2,574,274
SHUTTERING FOR THE CONSTRUCTION OF WALLS
Filed Aug. 6, 1947 15 Sheets-Sheet 2
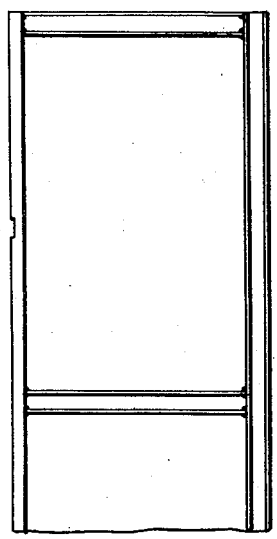
FIG: 2.
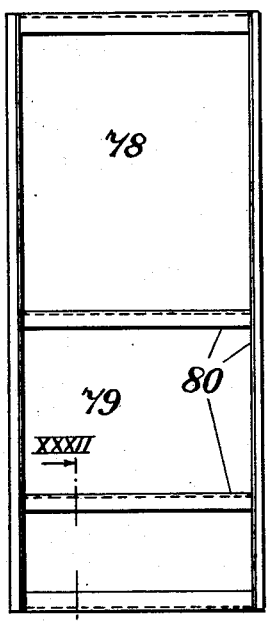
FIG: 27.
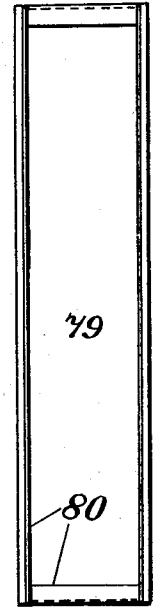
FIG: 28.
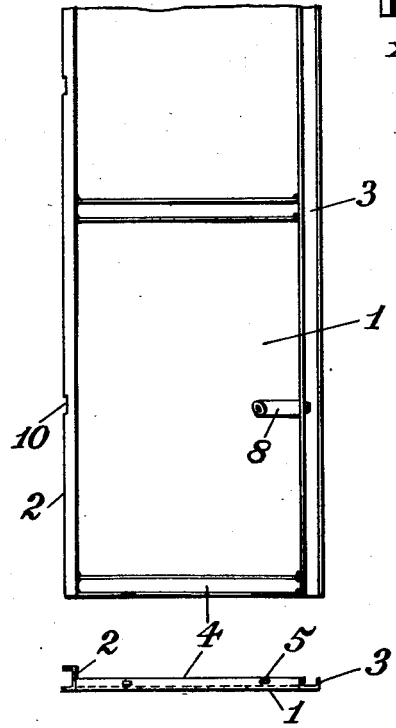
FIG: 3.
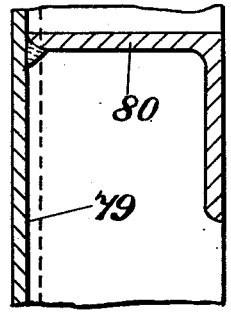
FIG: 30.
Inventor:
William McMullan
By John A. Marzall Atty.

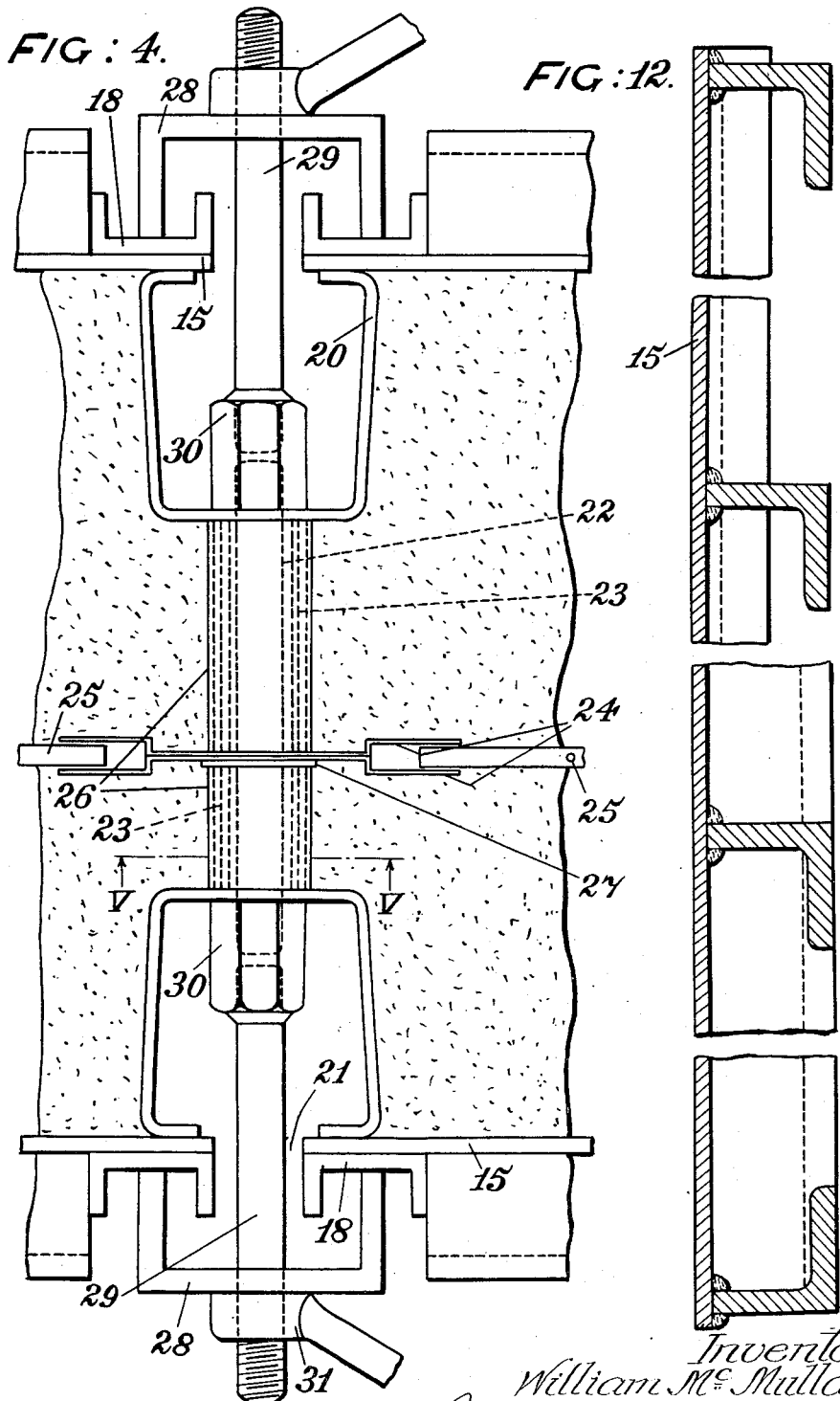

Nov. 6, 1951　　　W. McMULLAN　　　2,574,274
SHUTTERING FOR THE CONSTRUCTION OF WALLS
Filed Aug. 6, 1947　　　　　　　　　　　　　15 Sheets-Sheet 4
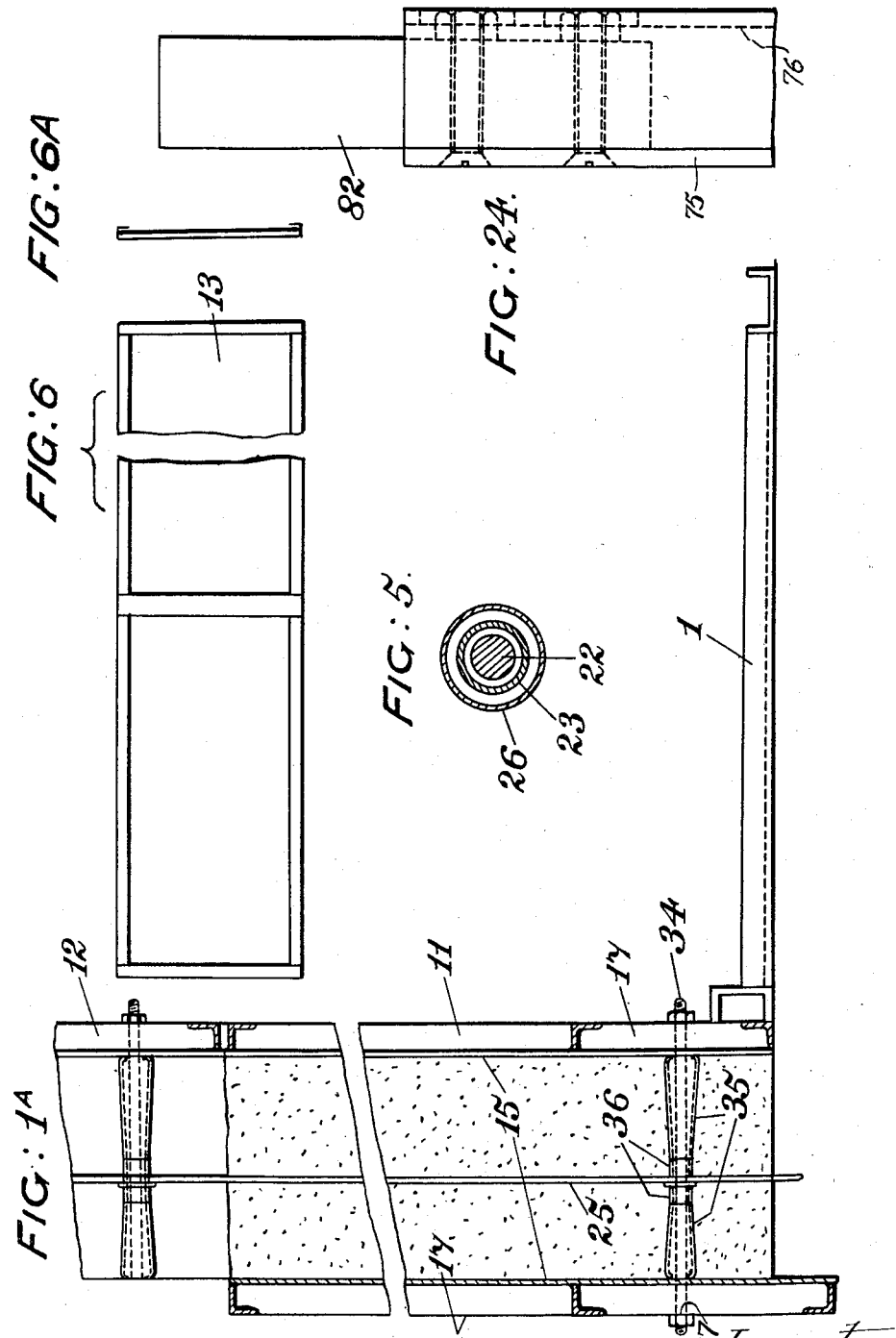
Inventor:
William McMullan
By: John A. Marzall, Atty.

Nov. 6, 1951 W. McMULLAN 2,574,274
SHUTTERING FOR THE CONSTRUCTION OF WALLS
Filed Aug. 6, 1947 15 Sheets-Sheet 5
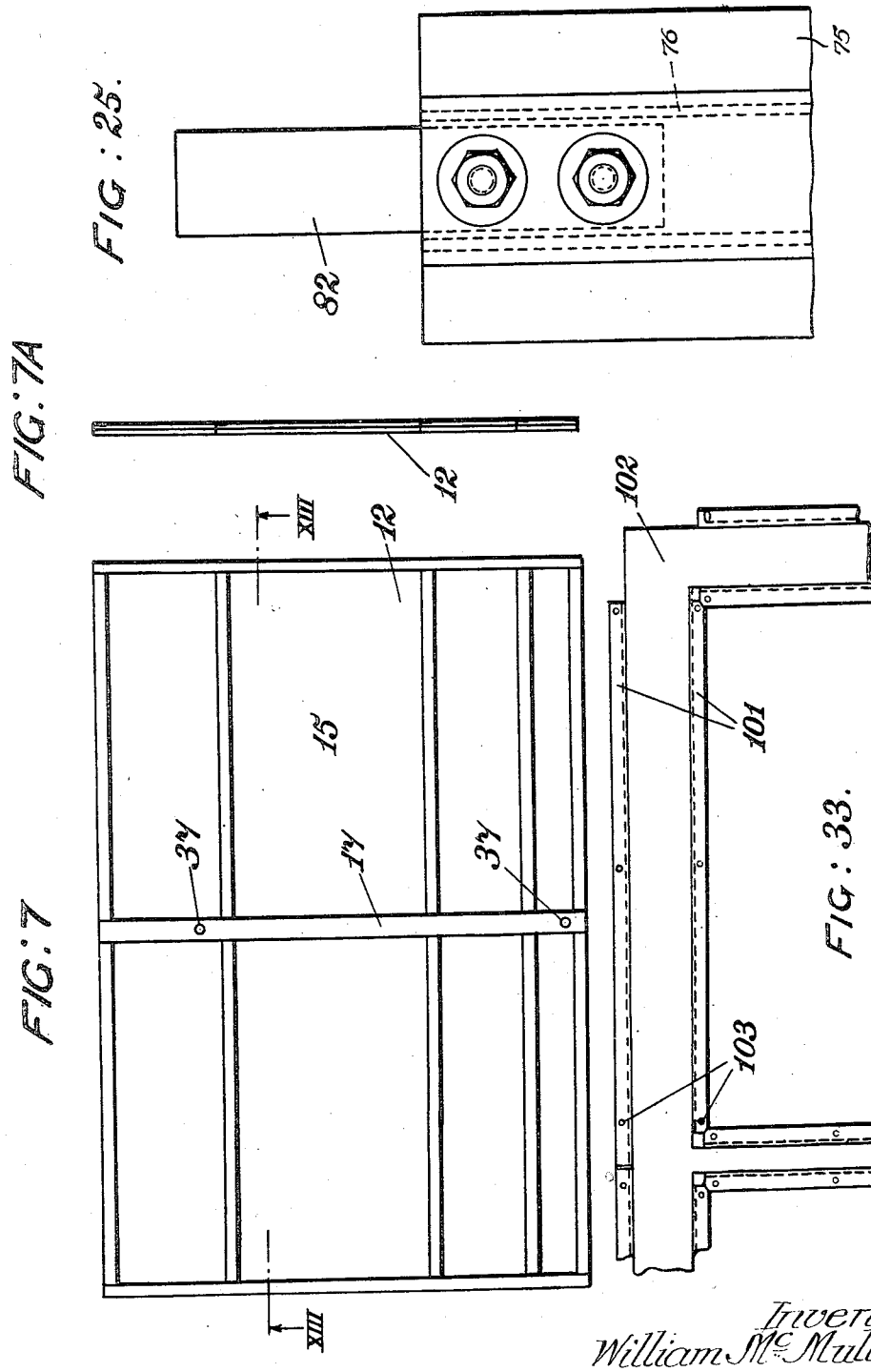

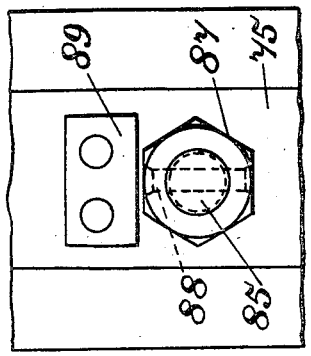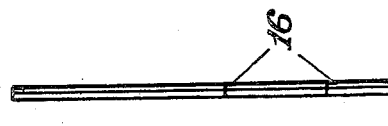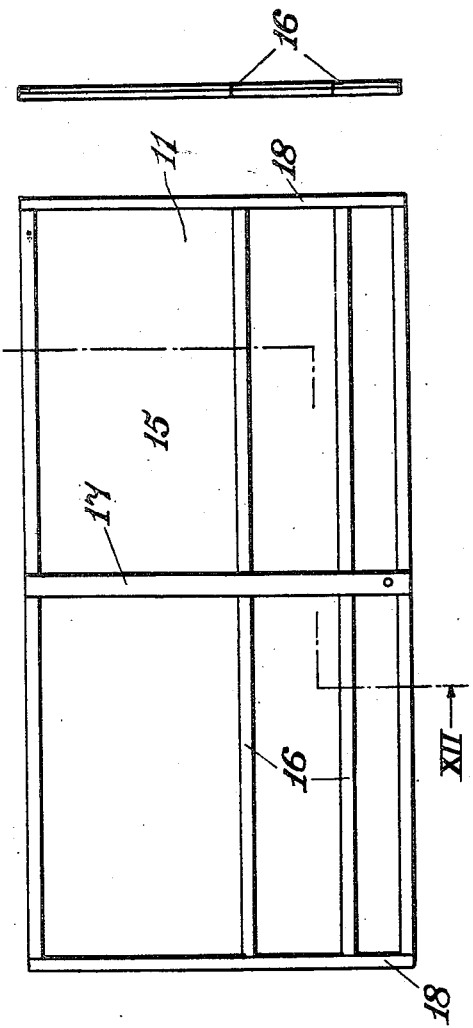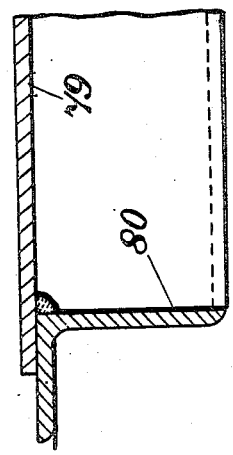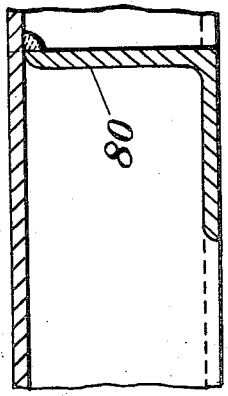
Inventor:
William McMullan
By: John A. Marzall Atty.

Nov. 6, 1951  W. McMULLAN  2,574,274
SHUTTERING FOR THE CONSTRUCTION OF WALLS
Filed Aug. 6, 1947  15 Sheets-Sheet 7
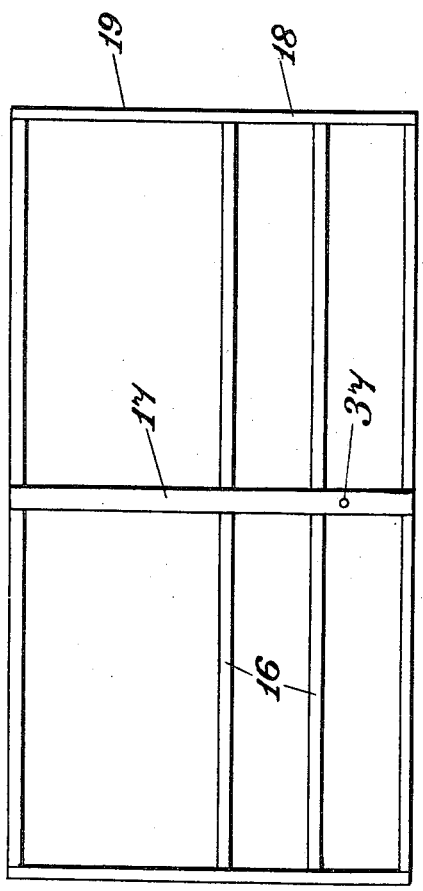
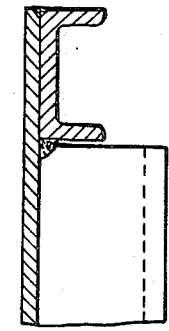
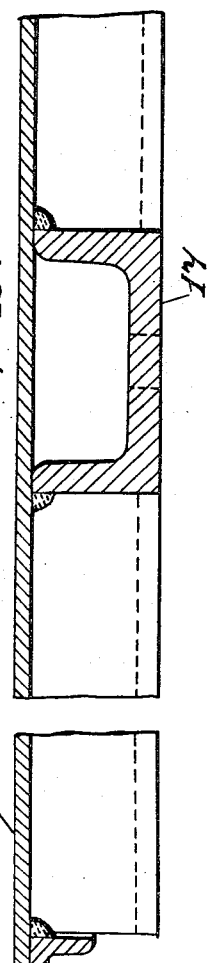
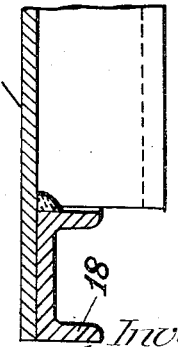
Inventor:
William McMullan
By: John A. Marzall
Atty.

Nov. 6, 1951 W. McMULLAN 2,574,274
SHUTTERING FOR THE CONSTRUCTION OF WALLS
Filed Aug. 6, 1947 15 Sheets-Sheet 8
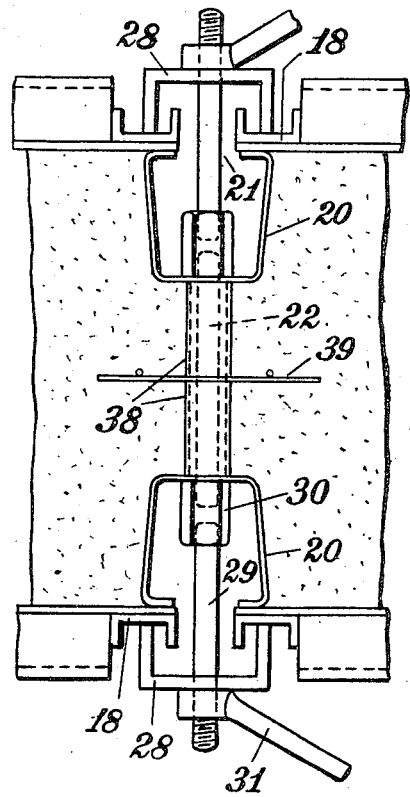
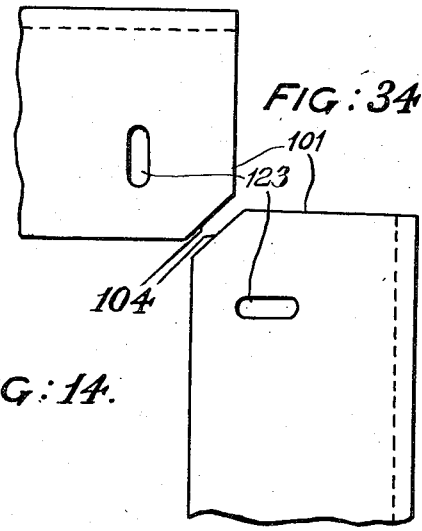
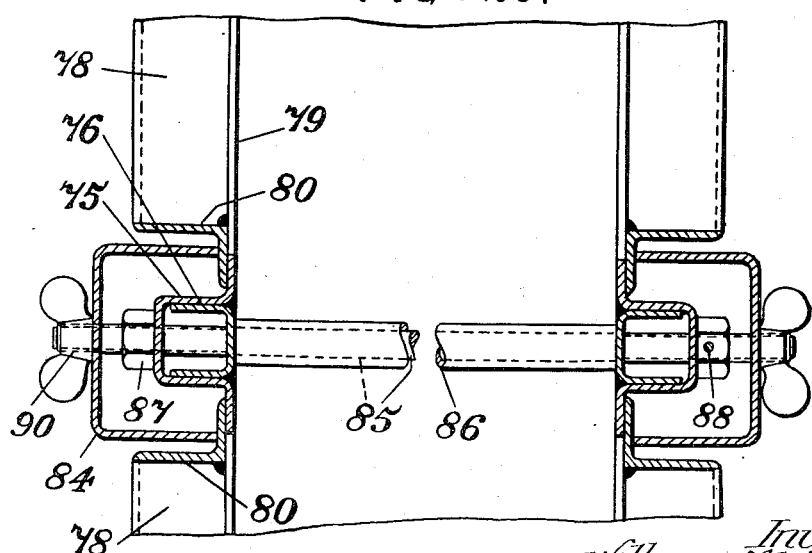

Nov. 6, 1951 W. McMULLAN 2,574,274
SHUTTERING FOR THE CONSTRUCTION OF WALLS
Filed Aug. 6, 1947 15 Sheets-Sheet 9
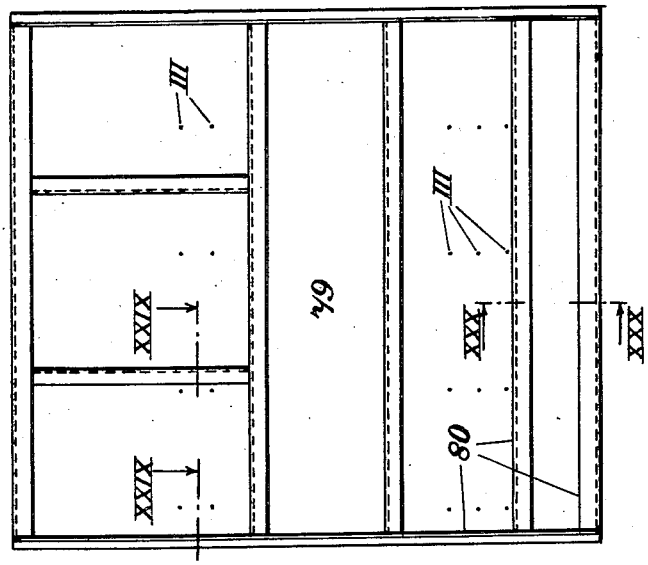
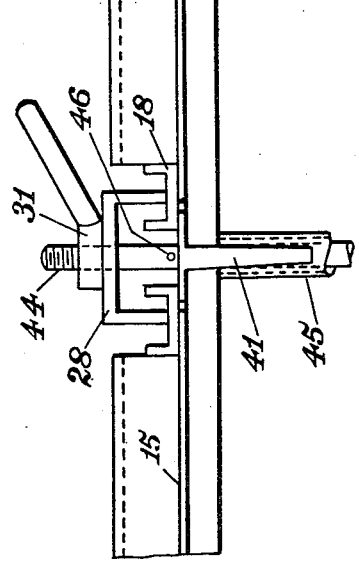
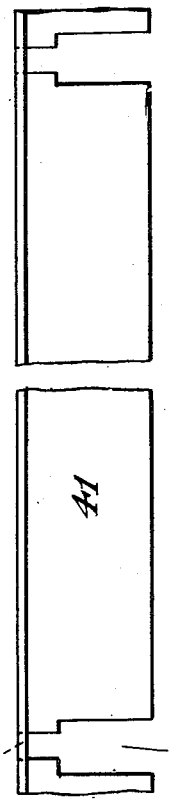
Inventor:
William McMullan
By John A. Marzall Atty.

Nov. 6, 1951 W. McMULLAN 2,574,274
SHUTTERING FOR THE CONSTRUCTION OF WALLS
Filed Aug. 6, 1947 15 Sheets-Sheet 10
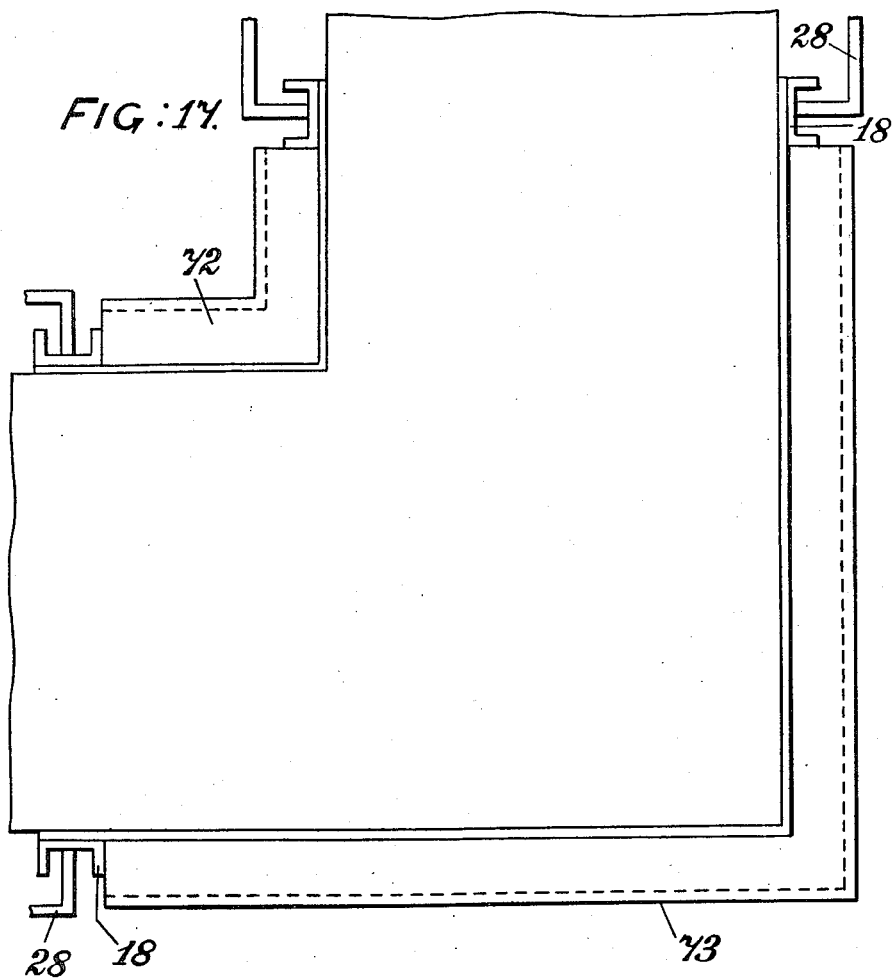
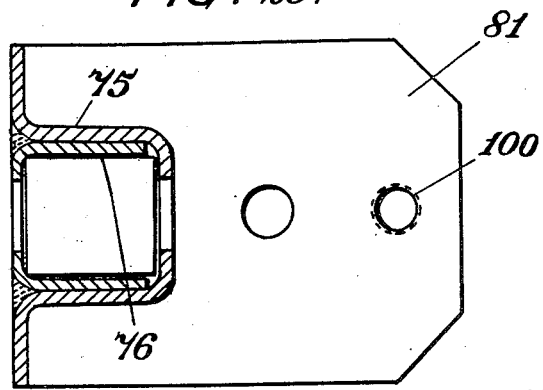
Inventor:
William McMullan
By: John A. Marzall, Atty.

Nov. 6, 1951 W. McMULLAN 2,574,274
SHUTTERING FOR THE CONSTRUCTION OF WALLS
Filed Aug. 6, 1947 15 Sheets-Sheet 11
FIG: 18.
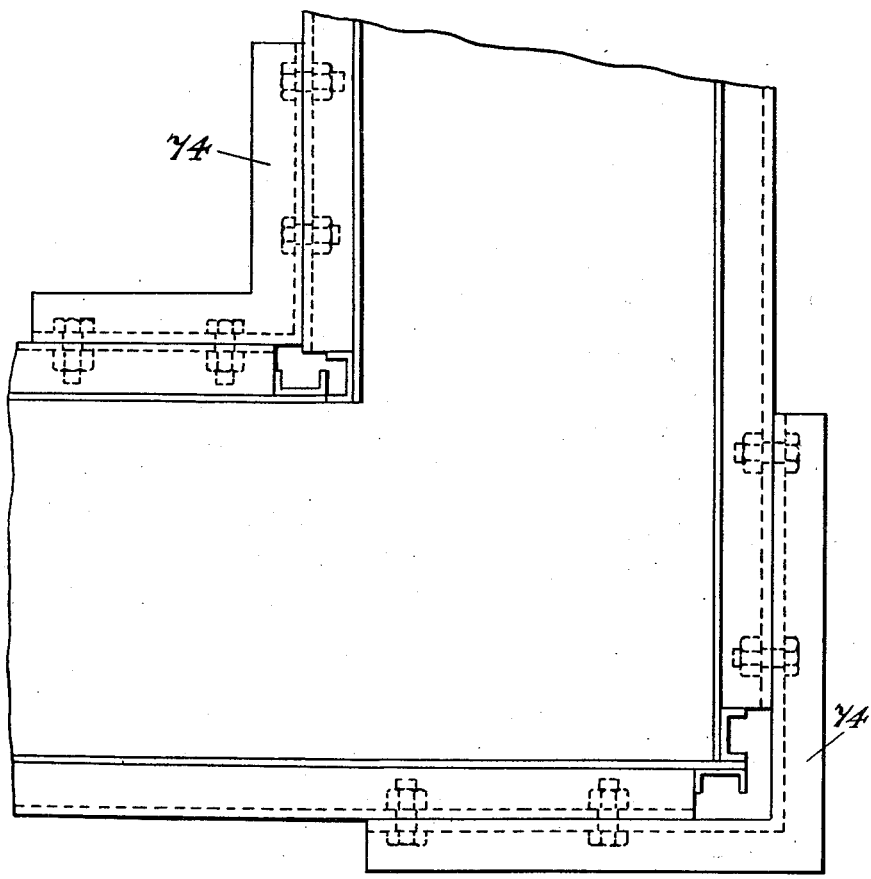
Inventor:
William McMullan
By John A. Marzall Atty.

Nov. 6, 1951    W. McMULLAN    2,574,274
SHUTTERING FOR THE CONSTRUCTION OF WALLS
Filed Aug. 6, 1947    15 Sheets-Sheet 12
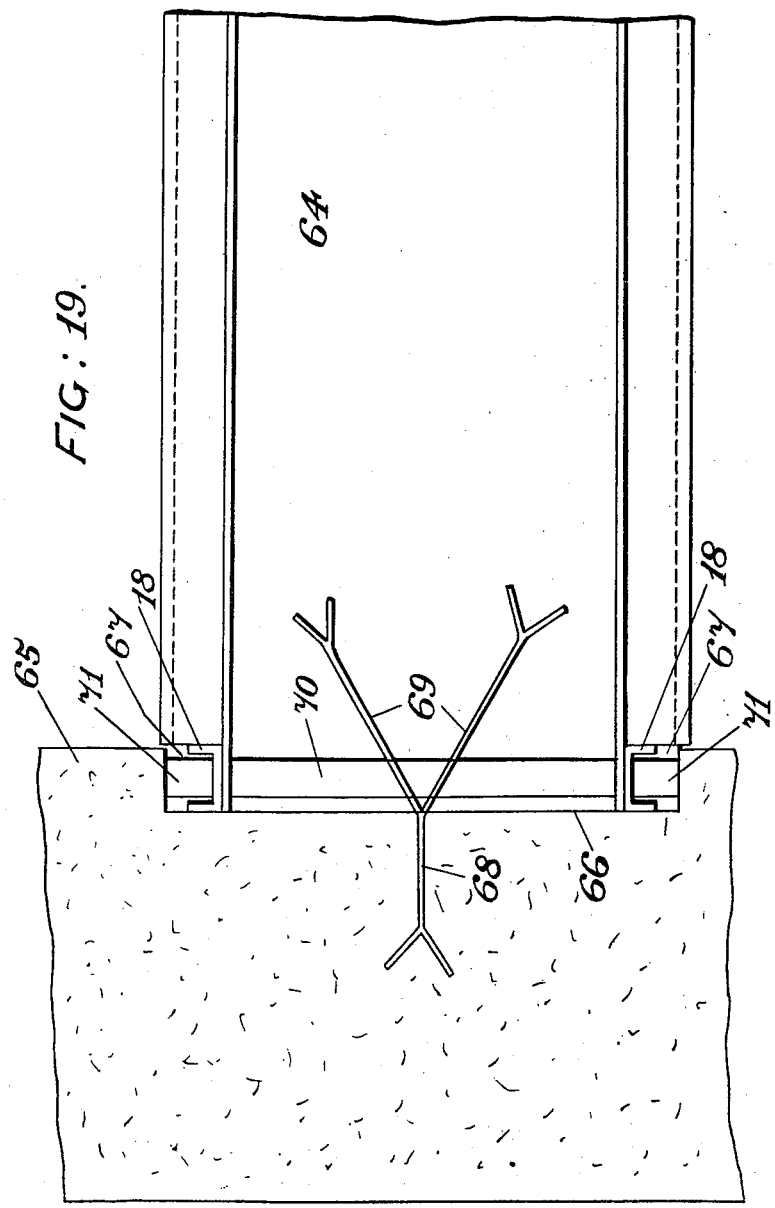
Inventor:
William McMullan
By: John A. Marzall
Atty.

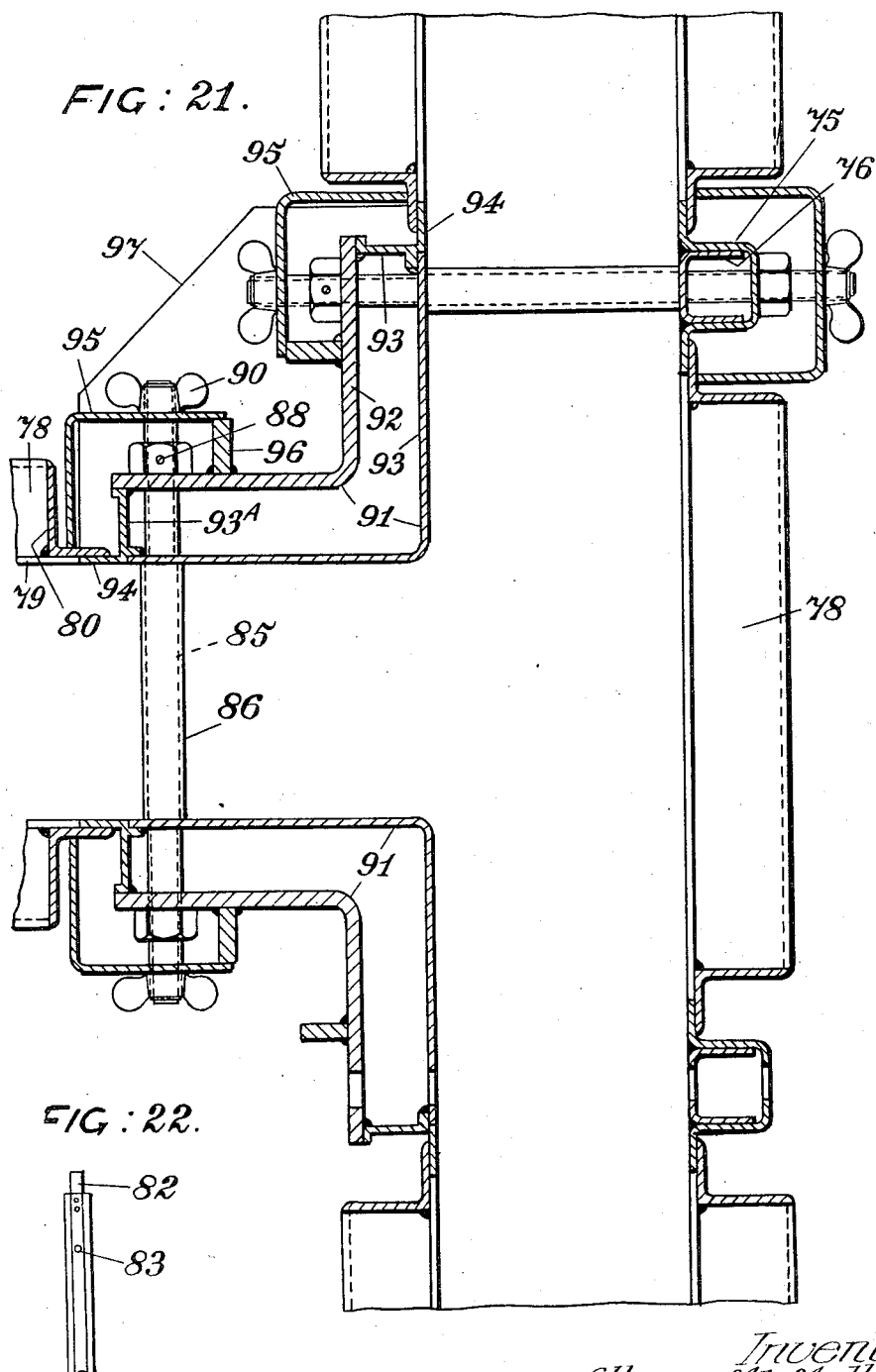

Nov. 6, 1951  W. McMULLAN  2,574,274
SHUTTERING FOR THE CONSTRUCTION OF WALLS
Filed Aug. 6, 1947  15 Sheets-Sheet 14
FIG: 32.
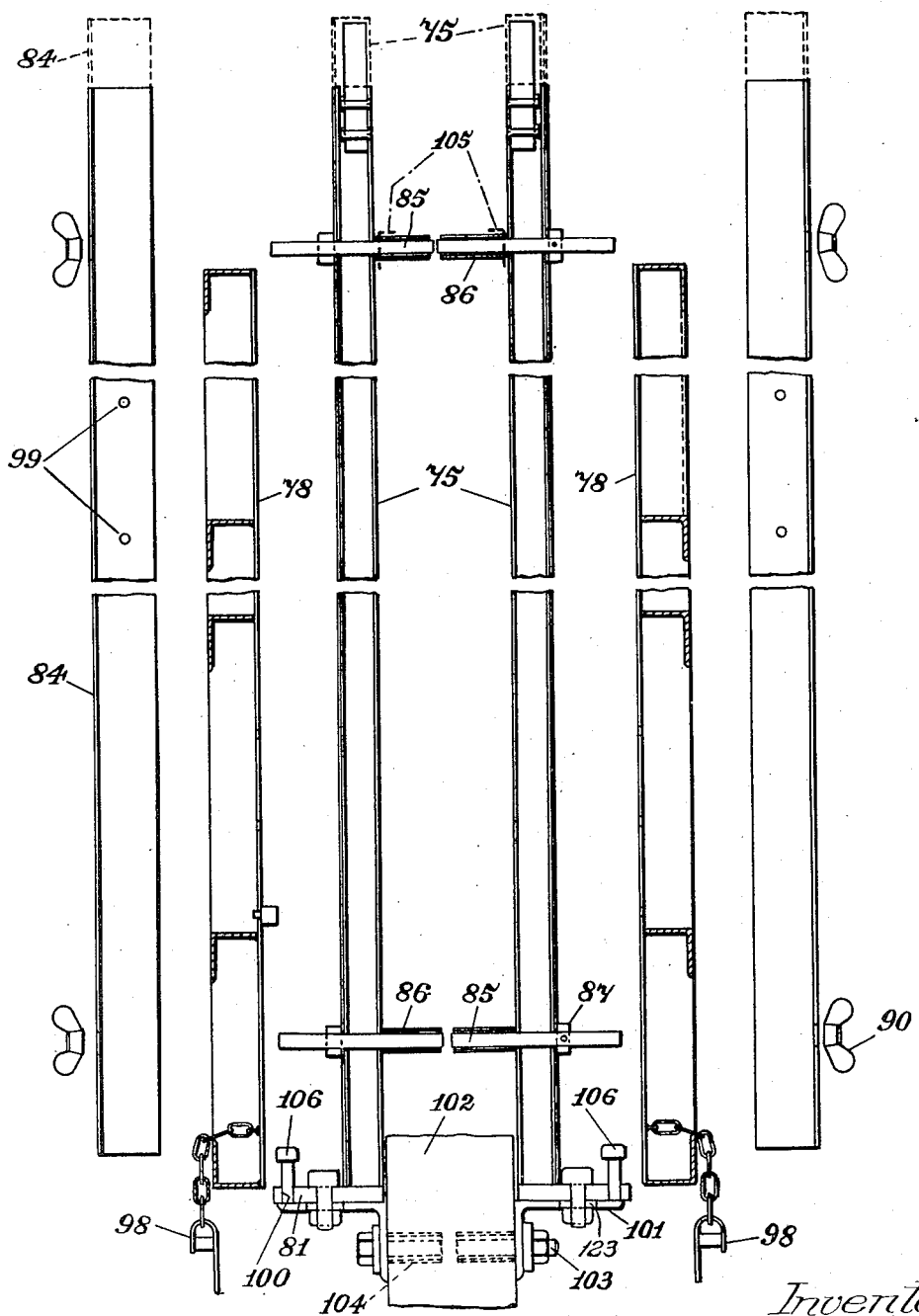

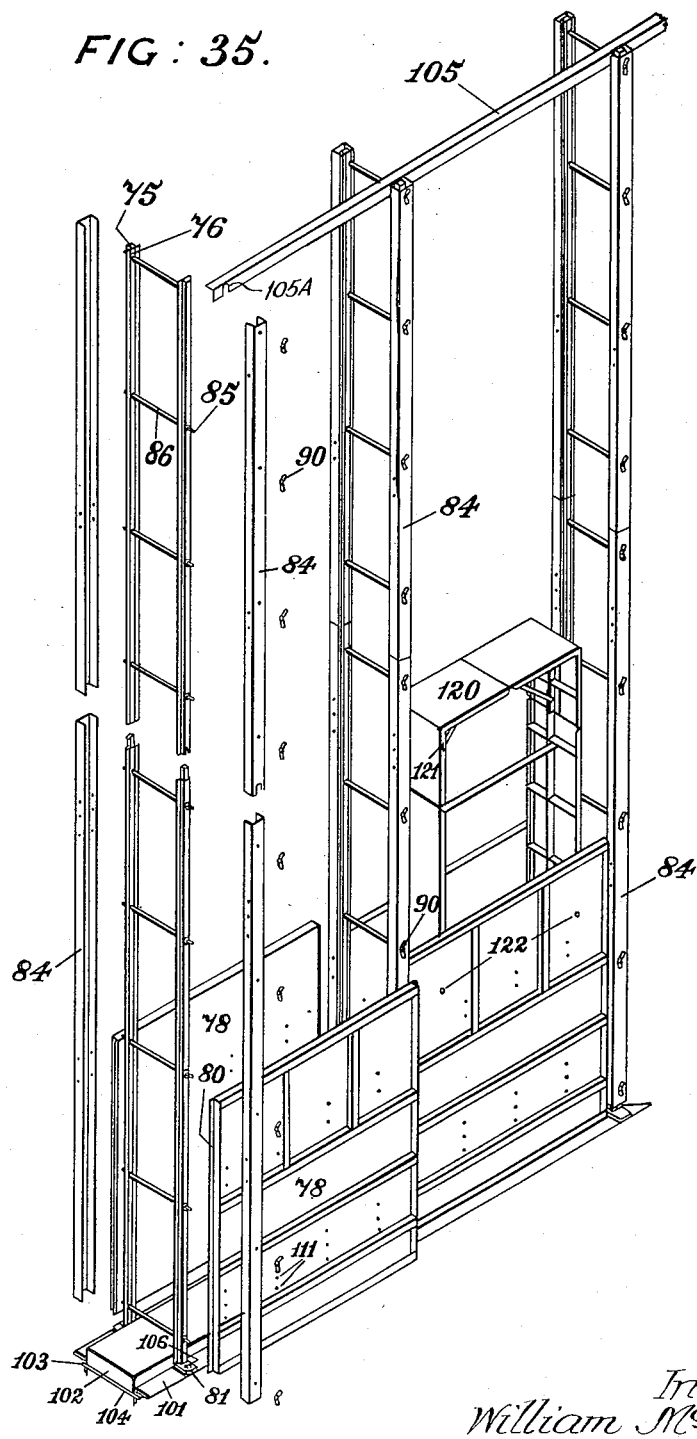

Patented Nov. 6, 1951

2,574,274

UNITED STATES PATENT OFFICE 2,574,274

SHUTTERING FOR THE CONSTRUCTION OF WALLS

William McMullan, Belfast, Northern Ireland, assignor to Farrans Limited, Belfast, Northern Ireland Application August 6, 1947, Serial No. 766,547
In Great Britain March 31, 1945

Section 1, Public Law 690, August 8, 1946
Patent expires March 31, 1965

8 Claims. (Cl. 25—131)

This invention relates to shuttering for the construction of walls or the like cast or formed of concrete or the like, an aim of the invention being to provide improved shuttering for this purpose.

One object of the invention is to provide shuttering means which comprises a plurality of spaced outer and inner guide and support assemblies, tie means detachably connected between said assemblies and adapted for subsequent withdrawal from the wall when cast and inner and outer shutter means adapted to be removably attached to said assemblies, at least one of said shutter means being vertically adjustable on said assemblies so as to be usable for the formation of successive "lifts."

One of said shutter means, preferably the inner, may comprise a plurality of edge to edge superimposed shutters while the outer shutter means comprises a shutter slidably adjustable to different vertical positions on the guide means so as to be opposed to different parts of the inner shutter means.

Alternatively, both inner and outer shutters may be slidably adjustable so that for each length of wall only one outer and one inner shutter is required for the formation of the successive lifts.

The support assemblies at one or both sides may comprise hollow column members which constitute withdrawable core means leaving vertical channels in one or both sides of the walls, which channels leave relatively weak parts in the wall adapted to cause the concentration of shrinking faults or the like in said parts.

Alternatively the hollow column members may be outset from the shutters and shaped to form a flush closure of the gap between adjacent shutters.

The shutters are preferably provided at the ends with channel or angle members whereby the shutters can be clamped by vertical channel members connected by the tie means.

The said assemblies are of sufficient stability to enable the superimposed shutters to carry window frame or the like parts so that the latter become automatically embedded in the wall in the course of casting or to carry means for forming openings to receive windows or doors after the wall has been cast.

In order that the invention may be clearly understood the following more specific embodiments will now be described but merely by way of example with reference to the accompanying drawings in which:

Fig. 1 is a section of the assembled shuttering looking at the end of the shutters while Fig. 1a is an end section elevation at the midspan of the shutters.

Figs. 2 and 3 are plan and elevation to a smaller scale of shoring templates.

Fig. 4 is a part plan view to an enlarged scale of a junction of assembled shutters and Fig. 5 is a sectional detail view on the line V—V of Fig. 4.

Figs. 6 and 6-A are a front elevation and an end elevation, respectively, of a top shutter, and Figs. 7, 7-A, 8, 8-A, 10 and 10-A are corresponding views of other shutters.

Figs. 9 and 11 are plan views corresponding to Figs. 8-A and 10-A.

Figs. 12 and 13 are enlarged sectional views on the lines XII—XII of Fig. 8 and XIII—XIII of Fig. 7. Fig. 14 is a plan view similar to Fig. 4 of a modified structure.

Fig. 15 is a part plan view of a further modified structure while Fig. 16 is an elevation of a member shown horizontal, it being understood that this member is vertical when in position as shown in Fig. 15.

Figs. 17 and 18 are plan views of two corner shutter constructions.

Fig. 19 is a plan view of the junction of an outside and a party wall.

Fig. 20 is a sectional plan view of a modified assembly especially for "no fines" concrete.

Fig. 21 is a sectional plan view of a party wall junction.

Fig. 22 is an elevation to a smaller scale of a column unit.

Fig. 23 is a sectional plan view to an enlarged scale of a column and Figs. 24 and 25 are elevations of the top of the column to an enlarged scale.

Figs. 26, 27 and 28 are front elevations of typical shutters and Figs. 29 and 30 are sectional views to a larger scale on the lines XXIX—XXIX and XXX—XXX of Figs. 26 and 27.

Fig. 31 is a detail view of locking means for the ties, and

Fig. 32 is a part elevation of an assembly.

Fig. 33 is a part plan view of box or support template means for the vertical assemblies as in Fig. 20 et seq. and Fig. 34 is a corresponding detail view to a larger scale.

Fig. 35 is a perspective view of shuttering as in Figs. 20 to 34.

Fig. 36 is a front elevation of the clip means shown in position in Fig. 4.

Referring to Figs. 1 to 3, shoring means is provided which comprises a plurality of templates 1 adapted to be laid down in such manner as to outline the inside edge of the wall to be constructed. These templates comprise rectangular frames formed by welding together channel members. The inner longitudinal channel 2 next to the wall is set with the channel facing the wall while the outside longitudinal channel 3 is set with the channel facing upwardly. These longitudinals are connected by transverse channel members 4 having the channels facing upwardly. The templates are adapted to be bolted endwise together and packing strips may be used at the joints to give any desired correction in overall length. Preferably the bolt holes 5 are slotted to allow correct aligning of the templates. Various other shapes of templates may also be provided for corners or other departures from a straight line. For a right angled corner a square template is employed. In order to secure the templates firmly in position the transverse channels 4 may be clamped by brackets 6 to floor joists 7 bedded in the concrete floor. Inclined strut means is attached at suitable intervals to the outer channel and each consists of two rods 8 joined by a central rod 9 which respectively engages the two rods by a right and left hand screw and thus admits of the overall length being adjusted. The lower rod is adapted to be bolted to the outer channel 3 while the upper rod is adapted to be bolted to vertical clamp channels to be described later. It will be understood that the templates provide a firm base and that the adjustment of the strut means enables the shuttering to be shored or supported in true vertical position. The inner longitudinal 2 of the templates is provided with recesses 10 in alignment with the struts to receive the said vertical clamp channels and thus automatically ensures correct spacing of the inner columns.

The inner shutter means as shown especially in Figs. 6 to 9 consists of a lower shutter 11, an intermediate shutter 12 and a top shutter 13. Typical heights for these shutters, which are of rectangular shape, may be respectively 3', 4' and 1' 6". The lower shutter (Fig. 8) consists of a frame of L and channel section members welded together and to which is welded a metal panel 15. The horizontal L-shaped stiffeners 16 which are welded to the ends of the frame and to the panel 15 are positioned in height according to the fluid pressure of the concrete. A central vertical stiffener 17 of channel section is also welded to the top and bottom member of the frame and to the panel where the span of the shutter requires it, the channel mouth being presented to the panel. The end vertical members 18 of the frame are of channel section and are welded with their backs to the panels so that they present two outwardly facing open channels which serve for the location and clamping of the shutters as will be described later. The intermediate shutter (Fig. 7) is of substantially similar construction but has a further transverse stiffener located substantially above the centre line. The top shutter (Fig. 6) is also of substantially similar construction but owing to its lesser depth no transverse stiffeners are used.

The outer shuttering corresponding to each three inside shutters consists, as shown in Figs. 10 and 11 of only one shutter 19 which is identical with the lowest inner shutter, except that it is 3' 2" high to allow or overlap on the "lift" below, see Fig. 1.

As shown more clearly in Fig. 4 the outer and inner shutters are adapted to be guided and supported at their adjoining ends respectively by outside and inside vertical, spaced columns. These assemblies are spaced according to the length of the shutters and as they are identical the description will be confined to an inner and outer assembly. Each consists of a vertical hollow column 20 of overall height equal to the height of the story or the full height of the building to be constructed and made, for example, of 14 S. W. G. steel sheet which is bent into substantially trapeziform cross section which has an opening 21 down the centre of the major parallel side, this being the outer side. The hollow columns 20 of an outer and inner assembly are adapted to be interconnected at suitable vertical intervals by composite tie means. Each tie means consists of a connecting bolt 22 screw-threaded at both ends and adapted to carry an inner distance piece 23 which, by engaging the inner walls of the columns 20, accurately predetermines the spacing thereof and the wall thickness. The bolt 22 passes through the said walls. Prior to inserting these bolts, clip means is located between the columns for locating the damp course or the like layer inside the wall to be formed. This means comprises two vertical metal strips 24 which are upset centrally and set with these upset parts abutting so that at each edge there is formed a vertical groove for receiving the edges of the said layers 25. The strips 24 have holes therein at suitable vertical intervals through which the said bolts and inner distance pieces can be passed. The strips are located by means of two outer distance pieces 26 which fit over each inner distance piece 23. These outer distance pieces 26 extend between each side of the clip means 24 and the inner and outer columns 20, and the external distance piece between the outer columns and the clip means may be shorter than the other so as to locate the layer nearer the outer side of the wall to be formed. There may be a washer 27 between the shorter distance piece and the clip means, for purposes of waterproofing where required.

The lowest inner shutter 11 and the external shutter are located in position with the ends of the inner faces thereof, which are formed by the panels 15, resting against the flange parts of the columns 20 and they are secured in position and joined to their adjacent fellows by vertical channels or clamp members 28 of U-cross section which are set with each limb of the U-member engaging in the outwardly presented channel of the end members 18 of the frames of adjacent shutters. These clamp channels together with the flange parts of the columns form vertical guide means for the shutters and the clamp channels are mounted or located on headed bolts 29 which are attached to the ends of the connecting bolt 22 inside the distance pieces or tubes 23, 26. Each headed bolt 29 has a hexagonal or the like head 30 on its inner end with a screwed recess by which it is screwed on to the connecting bolt 22 and at its outer end it is screwed for the attachment of a nut 31 with a handle which serves to hold the channel clamp 28. The feet of the latter are adapted to be located in the recesses 10 in the inner longitudinals of the templates, by a bolt 32 passing through the guide assembly and the outer channel of the template, this bolt also carrying distance tubes 33 for locating the clip means 24 (see Fig. 1).

It will be understood from the above that the inner and outer columns 20 are tied together and the layer 25 located in position by the bolt and distance piece assemblies. Furthermore, these assemblies clamp and tie the outer and inner shutters.

In use the templates 1 are fixed down and to each other and the lowest inner shutters 11, columns 20, and damp course layer 25 are brought into position and then tied together as above described. Then the stay members 8 of the templates are bolted to the tops of the channel clamps 28 for the inner shutters. These channel clamps are of a height to suit the said shutters but the corresponding outer clamps extend the full height of the wall to be formed. The vertical trim of the whole assembly can then be corrected as desired by adjustment of the stays 8. When the vertical trim has been adjusted, the lowest outer shutters are clamped in position and, as shown in Fig. 1, the assembly is ready for the first lift of concrete.

As shown in Fig. 1a, the shutters are preferably also tied together midway of their span by tie assemblies connecting the central vertical channels 17 in the shutter frames. Each tie assembly comprises a bolt 34 extending from one channel 17 to another through holes 37 in the channels 17 and adapted to receive clamping nuts at its ends. The bolt carries two outside distance pieces 35 of tapered shape and two inner shorter distance pieces 36. The latter bear at their inner ends on either side of the intermediate layers 25 and at their outer ends against the inner narrower ends of the tapered pieces 36 whose outer ends bear against the shutter panels 15. It will thus be seen that this tie means also locates the layer 25 and the nuts and bolts 34 can be removed to allow sliding of the shutter as described in the following paragraph.

The structure as in Fig. 1 is now ready for the concrete up to the level of the lowest inner shutter. When the concrete has set, for instance after 24 hours, the outer shutters are detached by loosening the hand bolts 31. Thereupon the outer shutters can be slid up the clamping channels 28 and secured in position for the next lift with the lower edge still overlapping the first lift of concrete. The said channels may have holes 37a (Fig. 1) to receive lateral pins to retain the outer shutters in place after being slid upwards and before being re-clamped. Thereafter the intermediate and upper inner shutters are fitted in position and the next and successive lifts are poured, the outer shutters being slid up stepwise as may be required to constitute the necessary cavity for filling.

When the wall has been formed practically the entire shuttering can be removed. First of all the shutters are removed by unscrewing the hand bolts 31 and removing the channel clamps 28. Then the headed bolts 29 are unscrewed to allow the columns 20 to be removed. Owing to their tapering shape they can be so removed and it will be understood that they leave vertical tapering channels in the wall between which there is a part of reduced thickness. Then the connecting bolts 22 and the inner distance pieces 23 are removed leaving only the outer distance pieces 26. These remain in the structure and are closed by a suitable plug to complete the insulation of the damp course. The tie means of the centres of the shutters, Fig. 1a, can also be completely removed except for the two inner distance pieces 36 which are also plugged.

The thin parts of the wall between the channels serve to localise therein all the cracks or the like that ensue on setting and when these have formed the outer channels and consequently the cracks are filled under pressure with any suitable cement rendering or the like. The inner channels are usually filled with the usual wall finish.

It will be understood that the damp course 25 separates the wall into outer and inner layers and that the clip means 24 serving to join the layers of the damp course also serve as interlocking means to prevent relative movement between the various spans of these layers along the planes of the cracks transverse to the plane of the wall.

Various modifications may be made without departing from the scope of the invention.

For example, as shown in Fig. 14 the damp course may be omitted thus dispensing with the need for the two outer concentric distance tubes. In this case the distance means may simply consist of two tubes 38 over the connecting bolt 22 and adapted to locate between them a vertical strip of reinforcing material 39 adapted to prevent the relative movement as above described. In this case the two distance pieces 38 remain in the wall and are plugged as above described.

In a further embodiment as shown in Figs. 15 and 16 the wall lining 40 may be assembled inside the internal shutters and adapted to constitute a permanent shuttering which remains in the wall. In this case the internal hollow columns are not used and are replaced by a vertical column member 41 of T cross section, the head of which overlaps the lining members 40 and the tail of which is tapered and projects between the ends of the lining members into the wall. The tail is slotted at 42 and the head drilled at 43 to receive the tie bolts 44 and distance pieces 45 and the bolt has a cross pin 46 to engage the T heads which are also engaged by the side channels 18 of the adjacent inside shutters. The T-piece is ultimately removed and the consequent space is filled with cement rendering or the like.

To enable the formation of a party wall 64 as shown in Fig. 19 an internal core member is provided on one of the internal shutters of the main wall 65 whereby a chase or recess 66 is formed inside the outer wall, said chase being wider than the party wall 64 to provide spaces 67. Attached to said core member is a reinforcing member, then of T-shape and of which the tail or stem 68 projects into the wall, being bifurcated. When the wall is set and the shutter removed the head 69 of the reinforcing member is bent out to Y-shape. Then shuttering as hereinbefore described is set up for the party wall with its ends in the spaces 67, a temporary distance piece 70 and steel wedges 71 being used. The former is removed as filling proceeds.

For corners special right angled shutters 72, 73 may be used as shown in Fig. 17 or straight shutters may be brought up to the corners as in Fig. 18 and joined by right angled brackets 74 which are bolted to the shutters by bolts passing through elongated holes allowing lateral adjustment between the angle brackets and the shutters.

The arrangements described provide a cheaper and more readily usable shuttering than hitherto. The provision of the vertical columns tied through the wall enables the shuttering to be set up with a minimum of shoring means and the provision of guide means such that the external shutters can be moved up stepwise reduces the amount of shuttering necessary. Furthermore, the vertical columns is such that the various lifts can be cast without any further addition of shoring means to support the shuttering.

The invention also provides the advantage that the wall shuttering can support further shuttering means for the formation of window, door or other recesses or for forming such recesses and at the same time supporting the window frames or the like so that they become automatically embedded in the recesses in the structure in the casting operation. Various other advantages will be evident from the foregoing description.

In the arrangement shown in Figs. 20 to 30 the hollow column members of previous arrangements are omitted. In this arrangement as shown more clearly in Fig. 20 each vertical assembly comprises a column made up from a member 75 of top hat section into which is welded a member 76, said members forming a flat obturating surface adapted to make a flush closure between the edges of adjacent shutters 78. As shown in Figs. 26 to 30 which show three typical shutters made from panels 79 and angles 80 the edges of the shutter have outwardly facing angle members 80 welded thereto and part of the width of the angle projects beyond the edges of the shutter panels and the flanges of said vertical members 75 overlap behind said projecting parts of the angles. The vertical member 75, as shown in Fig. 23, as welded to its lower end a base 81 which has holes 108 for attachment to locating template means or equivalent foundation means by bolts or the like. The foundation means may be formed by digging a trench to the desired shape of the structure and forming a foundation and erecting low shuttering and forming a low wall 102 with cross holes therein at accurately predetermined spacing whereby inner and outer angle templates 101 (Figs. 32, 33 and 34) can be secured by bolts 103 (Fig. 32) engaging holes in the vertical flanges and passing through sleeves 104 which admit of subsequent withdrawal of the bolts. The horizontal flanges have spaced elongated holes 123 at accurately predetermined spacing whereby the bases of the vertical column 75 (Fig. 32) can be secured thereto by bolts through the holes 108 and supported thereon. It will thus be understood that the low wall and template means ensure accurate spacing of the foot of the columns. Fig. 34 shows an inner corner construction, the corners being cut away at 104 in order to fit closely. The base is provided only on the lowermost obturating column, it being understood that a further column or columns may be superimposed on the lowermost column if the height of the structure requires, the various columns being engaged and joined together by means which includes projection and recess means. Alternatively the one column may be made of such height as to suit the structure being built. As shown in Figs. 22, 24 and 25, the lower column has a projection 82 secured therein, the upper column being fitted thereon. On the members 75 and 76 there are vertically spaced aligned holes 83 for tie means to be described later. As in the previously described arrangements the shutters 78 are held in position by vertical channel clamps 84 of which the limbs engage in the outwardly facing angles 80 at the edges of the adjacent shutters, these channel clamps having vertically spaced tie holes in alignment with the holes 83 in the columns 75, 76.

In use the obturating means, that is, the vertical columns, 75, 76 are set up opposite each other at the inner and outer faces of the wall to be formed, and are tied at vertical intervals by tie assemblies. Each tie assembly comprises a rod 85 screwed at both ends and which is passed through the holes 83 in the column members 75 and 76 and is also threaded through a tube 86 which is located between the columns 75, 76 and acts as a distance piece. Thereafter a nut 87 is screwed on to each end of the rod to secure the assembly. One of these nuts may be locked by a cross pin 88 on to the rod, the rod and nut being locked against rotation by a plate 89 attached to the column member 75 (see Fig. 31). Then the shutters 78 are located in position and engaged by the clamp channels 84 which have the vertically spaced holes whereby they can be placed on the ends of the rods 85 on which they are finally secured by wing nuts 90 which thus clamp the shutters.

Referring to Fig. 21 which shows a party wall junction, the corners are formed by two hollow fabricated angle columns or shutters 91. Each consists of an outer angle 92 and an inner angle 93 joined by welded cross members 93A presenting obturating parts 94 which fit the recess between the shutter panels 79 and the shutter angles 80. These angle columns are tied substantially as in the manner above described except that the clamp columns 95 are of simple angle section. One limb engaging the shutter angle 80 and the other a projection 96 welded to the outer angle 92 of the angle column. The face opposite the party wall is closed by a narrow shutter 78 as shown in Fig. 28. At the bottom and top these angle columns have plates 97 whereby they may be bolted to a foundation or whereby another length may be attached above the first length of the height if the structure so demands. In an alternative construction the corner shutter or column may simply consist of an angled plate having an outwardly facing channel at each edge so that they can be clamped to adjacent shutters by the normal clamping as in Fig. 20.

The method of manipulating the shutters will now be described more especially with reference to Fig. 32 which shows the shutters, columns and so on in their relative vertical positions for forming the first lift. It is to be understood that the shutters, columns and so on are shown laterally spaced from each other (exploded) merely for the sake of clearness, the actual assembled positions being as in Fig. 20. After the first lift is formed the wing nuts 90 are loosened so that both the external and inner shutter 78 (which are identical) can be slid up to the next position which is one with the lower edge of the shutters still overlapping the first lift of concrete. The shutters are temporarily supported in this position by the insertion of the chain-carried pins 98 into one of the holes 99 on each clamp channel 84. Then the wing nuts 90 are again tightened and the next lift is poured in and so on for as many lifts as desired. It will be understood that the channels 84 are provided with groups of pin holes 99 at suitable intervals for supporting the shutters and that owing to there being a group of holes at each interval the level of the outer shutters may be varied with respect to that of the inner shutters if so desired. Such variation in level may be necessary where a joint of steplike section is made between successive lifts of concrete. As indicated in chain dotted lines further channels 84 and columns, 75 may be superimposed to give extra height if required. The same applies to the corner columns 91.

It will be understood that the lateral spacing of the columns or vertical assemblies may be varied depending on the structure being erected and that the shutter lengths may be correspondingly varied.

It will also be understood that the shuttering described produces a wall without vertical recesses and an internal layer. It is more especially but not exclusively intended for "no fines" concrete which is subsequently rendered or faced, but it is to be understood that the shuttering may be used for the construction of any solid concrete walls where there is no need for weak zones for localising cracks. It will be evident that the assemblies can be readily taken down and the tie rods removed, the holes formed by the tubes being subsequently fiilled up.

It will be understood that it is important to effect correct spacing and plumbing of the vertical assemblies. Accurate spacing of the column feet is ensured by the template means already described. Parallelism as between the vertical assemblies can be insured by template bars or equivalent which can be placed at the top or other level of the assemblies and which extend continuously around the entire shuttering assembly. These bars consist of angle members 105, one at the outside and one at the inside of the wall as shown in chain dotted lines in Fig. 32 and as shown in Fig. 35, and having suitably spaced slots 105A in one flange to fit over the distance pieces 86 and thus ensure parallelism (in the plane of the wall) between the pairs of columns 75 and thus accurate spacing of the tops of the columns. These template bars are removed before concrete is poured in at the level at which the bars are set. Plumbing of the columns 75 at right angles to the plane of the wall may be effected by set screws 106 inserted into the holes 100 (Figs. 23 and 32) in the base 81 of the inner and outer columns. The bases 81 of these columns may also have two holes for set screws spaced in the plane of the wall. By relative adjustment of these screws plumbing can be effected in the plane of the wall.

In Fig. 35 there is shown an auxiliary frame shutter 120 for forming a door opening in the wall. The shutter 120 is detachably secured to the panel shutters 78 by slots 121 and bolts 122.

The invention provides shuttering which possess substantial advantages additional to those already mentioned and including inter alia:

(a) The use of the continuous clamping members such as 28 or 84 which grip the edges of the shutters from top to bottom and thereby constitute vertical reinforcement for the shutters reduces the need for integral vertical reinforcing members in the shutters and by thus reducing the weight of the shutters enable the use of relatively large shutters which are not too heavy for handling. The continuous clamping members also provide for any desired degree of vertical adjustment of the panels as distinct from adjustment in predetermined steps and when loosened allow the shutters to move out and slide free of the wall surface.

(b) The provision of the template means which as already described enables accurate location of the columns and the provision of means for plumbing the columns with respect to the template means and the provision of spacer or template bars for ensuring correct spacing at the top of the columns.

(c) The provision of withdrawable tie means which enables the columns to be tied below the level of the concrete without permanently embedding the whole of the tie means in the wall. These ties thus eliminate the need of shoring and the like to prevent spreading due to the hydraulic pressure of the wet concrete.

(d) The provision of spacer tubes in the tie means enables accurate spacing of the columns of each pair and the column pairs in Fig. 20 et seq can be tied together while horizontal and are light enough then to be handled as a unit and erected on the template angles.

All of these advantages contribute to the provision of a shuttering which is relatively cheap, light and easily handled, is stable with a minimum of shoring, as in Fig. 1 or without extraneous shoring as in Fig. 32, is substantially completely recoverable for subsequent use and can be accurately and repeatedly set as to wall thickness, outline and plumbing.

What I claim is:

1. Shuttering means for the construction of cast walls comprising a plurality of opposed columns, tie means detachably connecting opposed columns, vertical continuous clamp members extending up alongside the columns, shutters extending between the columns with the adjacent ends of the shutters projecting in between the clamp member and columns and fastening members attached to the tie means to secure the clamp members in position to clamp the ends of the shutters on the columns, the clamp members and columns constituting a continuous guide allowing infinitely variable vertical sliding movement of the shutters when the fastening members are loosened and constituting a continuous vertical bracing for the ends of the shutters when the fastening members are tightened.

2. Shuttering means for moulding concrete or the like walls comprising a plurality of opposed support columns, a plurality of shutters for defining the wall surface between the columns, vertically extending clamp members forming in conjunction with the columns vertical guide ways for slidably receiving the vertical edges of the shutters and vertically spaced tie means for detachably connecting opposed columns, each tie means comprising a tie member extending through and between the columns and out through the clamp members to carry the letter, a sleeve extending between the columns and surrounding the tie member and serving as a distance member for the columns and screw fastening means for holding the columns on the tie members which can be subsequently withdrawn from the sleeves and the ultimately formed wall and further screw fastening means on the ties for tightening the clamp members to grip and brace the vertical edges of the shutters continuously from top to bottom.

3. Shuttering means as claimed in claim 2, in which the sleeve has two outer shorter sleeves thereon engaged by the columns to sandwich between them an insert, said outer sleeves remaining in the wall but allowing withdrawal of the inner sleeve and tie member.

4. Shuttering means for the casting of concrete walls comprising a plurality of opposed columns, vertically spaced tie means detachably connecting opposed columns and including a tie rod with screwed ends projecting through the columns, wall-surface-forming shutters extending between the columns at each side of the wall with the vertical edges overlapping the columns, a vertically extending clamp member mounted on said screwed ends and nut means for securing the clamp members so that each clamp member clamps the adjacent vertical edges of the shutters against the column, the columns and clamp members constituting guides for vertical shift of the shutters when the bolt means is loosened.

5. Shuttering means as claimed in claim 4, wherein each clamp member comprises an inwardly facing channel releasably clamping outwardly facing channels on the vertical edges of the shutters.

6. Shuttering means as claimed in claim 4, wherein each clamp member comprises an inwardly facing channel member and the shutters have vertical angle members at the edges which are releasably clamped between the channel member and the column.

7. Shuttering means for the construction of walls cast of concrete or the like comprising in combination a plurality of outer and inner vertical columns spaced along the direction of the wall with the inner columns located opposite the outer columns, vertically spaced tie means detachably connecting opposed columns, inner and outer shutters, and clamping means for movably attaching the inner and outer shutters respectively between adjacent inner and outer columns, each clamping means comprising a vertically extending clamp member detachably supported on the tie means and together with the column forming a vertical guide for receiving the vertical edge of the shutter and enabling vertical sliding adjustment thereof and nuts on the tie means for tightening the clamp member to grip the said edge of the shutter continuously from top to bottom against the column and thus position and brace the shutter vertically.

8. Shuttering means for the casting of concrete walls comprising a plurality of opposed columns, vertically spaced tie means detachably connecting opposed columns and including a tie rod with screwed ends projecting through the columns, wall-surface-forming shutters extending between the columns at each side of the wall with the vertical edges overlapping the columns, a vertically extending continuous clamp member mounted on said screwed ends and nut means for securing the clamp members so that each clamp member clamps from top to bottom the adjacent vertical edges of the shutters against the column and positions the shutters and also vertically braces the vertical edges thereof, the columns and clamp members constituting guides for vertical shift of the shutters when the bolt means is loosened.

WILLIAM McMULLAN.

REFERENCES CITED

The following references are of record in the file of this patent:

UNITED STATES PATENTS

| Number | Name | Date |
| --- | --- | --- |
| 676,785 | Toelpe | June 18, 1901 |
| 953,722 | Taylor | Apr. 5, 1910 |
| 1,101,592 | Wagner | June 30, 1914 |
| 1,114,013 | Millar | Oct. 20, 1914 |
| 1,292,986 | Ambursen | Feb. 4, 1919 |
| 1,421,986 | Phillips | July 4, 1922 |
| 1,658,681 | Jordan et al. | Feb. 7, 1928 |
| 1,940,545 | Holmes | Dec. 19, 1933 |
| 1,958,076 | Vincent | May 8, 1934 |
| 2,099,260 | Colt | Nov. 16, 1937 |
| 2,313,880 | Leggett, Sr. | Mar. 16, 1943 |